(12) United States Patent
Deng

(10) Patent No.: US 11,721,136 B2
(45) Date of Patent: Aug. 8, 2023

(54) VEHICLE MOVEMENT IDENTIFICATION METHOD AND DEVICE, AND VEHICLE ALERT SYSTEM

(71) Applicant: ZTE CORPORATION, Guangdong (CN)

(72) Inventor: Qingtian Deng, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 194 days.

(21) Appl. No.: 17/286,819

(22) PCT Filed: Nov. 14, 2019

(86) PCT No.: PCT/CN2019/118310
§ 371 (c)(1),
(2) Date: Apr. 19, 2021

(87) PCT Pub. No.: WO2020/098729
PCT Pub. Date: May 22, 2020

(65) Prior Publication Data
US 2021/0375074 A1    Dec. 2, 2021

(30) Foreign Application Priority Data

Nov. 15, 2018 (CN) .......................... 201811361015.5

(51) Int. Cl.
*G07C 5/00* (2006.01)
*G07C 5/08* (2006.01)

(52) U.S. Cl.
CPC ............... *G07C 5/008* (2013.01); *G07C 5/08* (2013.01)

(58) Field of Classification Search
CPC .................................. G07C 5/008; G07C 5/08
USPC ...................................................... 340/426.18
See application file for complete search history.

(56) References Cited

U.S. PATENT DOCUMENTS

| 10,569,755 | B2* | 2/2020 | Maron ..................... B60T 7/122 |
| 2005/0119798 | A1* | 6/2005 | Lee ............................ G01P 7/00 |
| | | | 701/1 |
| 2007/0149133 | A1* | 6/2007 | Lee ....................... H04B 17/382 |
| | | | 455/67.11 |
| 2010/0210211 | A1* | 8/2010 | Price ..................... H04W 8/005 |
| | | | 455/41.3 |

(Continued)

FOREIGN PATENT DOCUMENTS

| CN | 202716850 U | 2/2013 |
| CN | 103213565 A | 7/2013 |

(Continued)

OTHER PUBLICATIONS

International search report of PCT Patent Application No. PCT/CN2019/118310 dated Feb. 7, 2020.

*Primary Examiner* — Kerri L McNally
*Assistant Examiner* — Thang D Tran

(57) ABSTRACT

A vehicle movement identification method and device, and a vehicle alert system. The method comprises: after a vehicle shuts off, collecting real-time state data of the vehicle by means of a sensor (74) provided for the vehicle (S202); comparing the real-time state data with the pre-stored post-shutdown stationary state data of the vehicle (S204); and determining, according to the comparison result, whether the vehicle is moved by a tow truck (S206).

18 Claims, 6 Drawing Sheets

(56) References Cited

U.S. PATENT DOCUMENTS

| | | | | |
|---|---|---|---|---|
| 2015/0222349 | A1* | 8/2015 | Sloan | H04W 4/40 455/7 |
| 2016/0019497 | A1* | 1/2016 | Carvajal | H04L 67/104 705/333 |
| 2016/0159279 | A1* | 6/2016 | Mori | G07C 9/00174 340/438 |
| 2016/0297399 | A1* | 10/2016 | Suzuki | E05F 15/70 |
| 2017/0050563 | A1* | 2/2017 | Bosscher | H04N 5/23299 |
| 2017/0213468 | A1* | 7/2017 | Duerksen | G08G 5/065 |
| 2018/0023977 | A1* | 1/2018 | Park | B60C 23/0416 324/207.2 |
| 2018/0186309 | A1* | 7/2018 | Batten | B60Q 1/503 |
| 2018/0346025 | A1* | 12/2018 | Shepard | G07C 5/008 |
| 2018/0364328 | A1* | 12/2018 | Mielenz | G01S 7/40 |
| 2019/0009815 | A1* | 1/2019 | Lavoie | B62D 13/06 |
| 2019/0016264 | A1* | 1/2019 | Potnis | B60D 1/245 |
| 2019/0122460 | A1* | 4/2019 | Reyes | G06V 20/56 |
| 2019/0241118 | A1* | 8/2019 | Fukunaga | B60Q 1/115 |
| 2019/0322284 | A1* | 10/2019 | Yang | G01M 17/007 |
| 2020/0031312 | A1* | 1/2020 | Schat | G01S 13/605 |
| 2020/0094848 | A1* | 3/2020 | Hu | G07C 5/0808 |

FOREIGN PATENT DOCUMENTS

| | | |
|---|---|---|
| CN | 203047163 U | 7/2013 |
| CN | 104129360 A | 11/2014 |
| CN | 104442709 A | 3/2015 |
| CN | 105438123 A | 3/2016 |
| CN | 205589181 U | 9/2016 |
| CN | 107776537 A | 3/2018 |

\* cited by examiner

VEHICLE MOVEMENT IDENTIFICATION METHOD AND DEVICE, AND VEHICLE ALERT SYSTEM The present disclosure claims the priority to the Chinese patent application CN201811361015.5 entitled "Vehicle movement identification method and device, and vehicle alert system" filed on Nov. 15, 2018, the entire content of which is incorporated herein by reference.

FIELD OF THE INVENTION

The present disclosure relates to the field of communications, and in particular, to a vehicle movement identification method and device, and a vehicle alert system.

BACKGROUND OF THE INVENTION

The Internet of Vehicles is a bridge and a carrier, and it is also a basic function of future cars. Based on this, for situations where cars are towed by tow trucks when they are parked, provided currently is towing identification alerting. Such towing identification alerting however is used only in few vehicles at present, and with even those vehicles of pre-researched models that support the towing identification alerting, there are also various problems. According to the industry information, the defects of the towing alerting mainly lie in its low identification rate, high probability of misidentification, and high power consumption because the misidentification of various vehicle conditions can easily lead to abnormal situations such as battery loss. There are usually the following two feasible methods of identifying a towing operation.

In one known method, the acceleration sensor performs simple identification of the tilt caused by the towing operation, or performs the identification by comparing acceleration values after the vehicle is running.

Problems however arise from the simple algorithm, and the main problem is that the algorithm fails to comprehensively consider various scenarios, which leads to a high probability of misidentification, a high reporting frequency, and bad user experience.

In another known method, the sensor is combined with the GPS for positioning. The sensor is responsible for identifying moving and stationary motions and starting the GPS so as to compare positions based on location information and confirm whether the vehicle is moving. This identification method relies more on data acquired by the GPS. It is advantageous in that no misidentification can arise, but it is disadvantageous in that the defect of the algorithm in the sensor's identification for moving and stationary motions can cause the system where the GPS is located to start frequently, resulting in excessive power consumption. In addition, in the traditional method, information on the current position is periodically reported through the data acquired by the GPS, and the alert function is realized by a distance difference resulted from comparing the positions. This method is disadvantageous in that it also requires periodic starting of the GPS device, which consumes a lot of power. Besides, the process of searching and capturing satellite signals, reading data from a large number of satellites, and calculating positions from the data receiver is also very time-consuming, and it may take several minutes to start the GPS cold or warm. In most scenarios, such a long time is unacceptable. Frequent starting also causes huge power consumption, which greatly affects the service life of the battery. Information about the identification cannot be reported in the first time but within a certain period.

No effective solution to the problem of high misidentification rate or high power consumption in identifying a vehicle being moved by a tow truck has been proposed in the related technologies.

SUMMARY OF THE INVENTION

The embodiments of the present disclosure provide a vehicle movement identification method, a vehicle movement identification device, and a vehicle alert system, which can at least solve the problem of high misidentification rate or high power consumption in identifying a vehicle being moved by a tow truck in the existing technologies.

According to an embodiment, a vehicle movement identification method is provided. The vehicle movement identification method includes: collecting real-time state data of the vehicle by means of a sensor provided for a vehicle after the vehicle is shut off; comparing the real-time state data with pre-stored post-shutdown stationary state data of the vehicle; and determining whether the vehicle is moved by a tow truck according to a comparison result.

According to another embodiment, a vehicle alert system is also provided. The vehicle alert system includes a lower computer, a sensor, and a networked device. The lower computer is connected to the sensor, and the lower computer communicates with the networked device. The sensor is used to collect real-time state data of a vehicle after the vehicle is shut off. The lower computer is used to compare the real-time state data with pre-stored post-shutdown stationary state data of the vehicle, and send an alert message to the networked device when a comparison result indicates that the vehicle is being moved by a tow truck. The alert message is used to indicate that the vehicle is moved by a tow truck. The networked device is used to establish a connection with a server, and send the alert message to a mobile device through the server.

According to yet another embodiment, a vehicle movement identification device is also provided. The vehicle movement identification device includes: a collecting module, which is used to collect real-time state data of a vehicle by means of a sensor provided for the vehicle after the vehicle is shut off; a comparing module, which is used to compare the real-time state data with pre-stored post-shutdown stationary state data of the vehicle; and a first determining module, which is used to determine whether the vehicle is moved by a tow truck according to a comparison result.

According to further another embodiment, an electronic device is also provided. The electronic device includes a memory and a processor. The memory stores thereon a computer program, and the processor is configured to execute the computer program to implement steps of the method according to any of the above method embodiments.

BRIEF DESCRIPTION OF THE DRAWINGS

The drawings described herein are used to provide better understanding of the present disclosure and constitute a part of the present disclosure. The exemplary embodiments and descriptions thereof are used to explain the present disclosure, and do not constitute improper limitations to the present disclosure. In the drawings.

DETAILED DESCRIPTION OF THE EMBODIMENTS

The present disclosure will be described below in detail with reference to the drawings and in conjunction with the embodiments. It should be noted that the embodiments in the present disclosure and the features in the embodiments can be combined with one another as long as there is no conflict.

Embodiment 1

Figure 1:
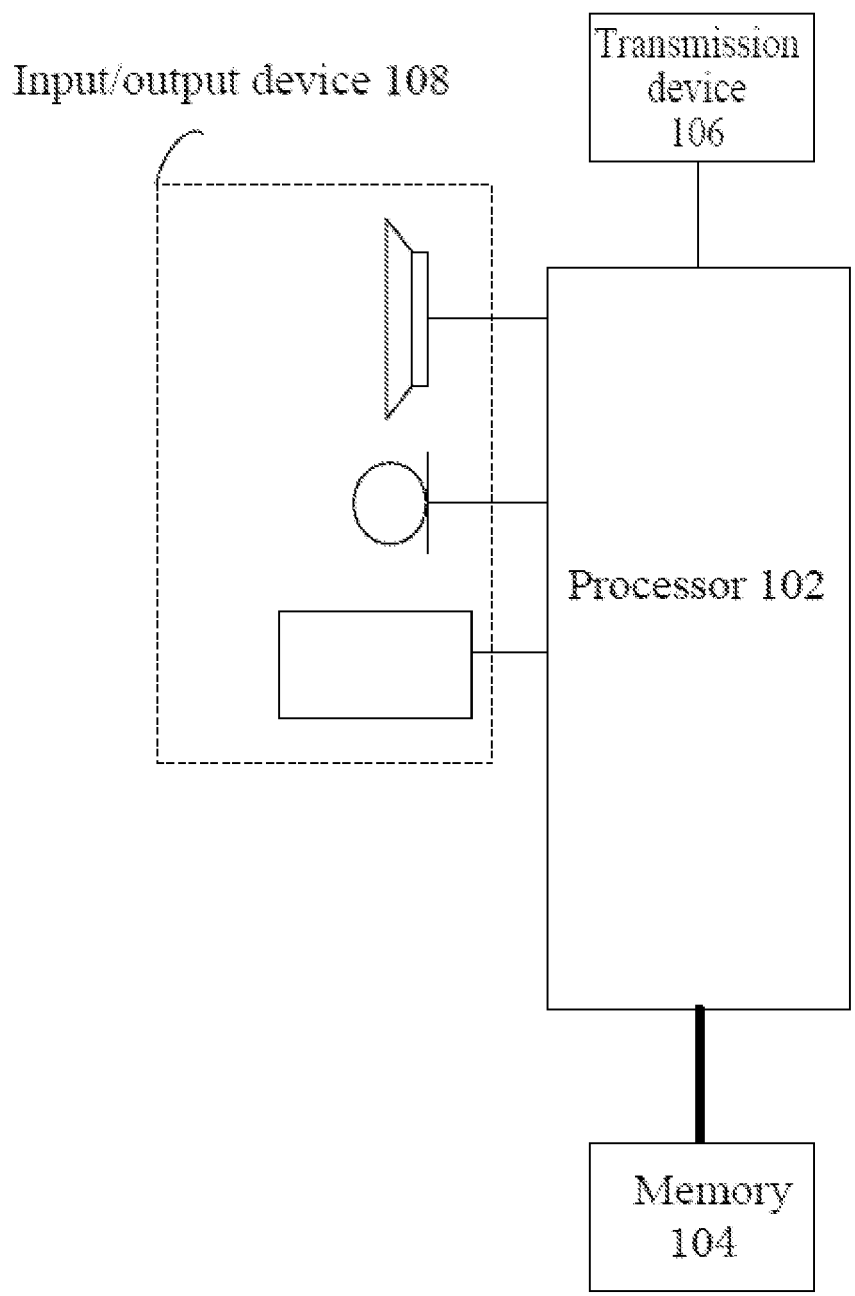
FIG. 1 is a block diagram of a hardware structure of a mobile terminal used in a vehicle movement identification method according to an embodiment of the present disclosure.

The method provided in Embodiment 1 may be executed on a mobile terminal, a computer terminal or a similar computing device. Provided here is an example in which the method is executed on a mobile terminal. FIG. 1 is a block diagram showing a hardware structure of a mobile terminal used in the vehicle movement identification method according to the embodiment. As shown in FIG. 1, the mobile terminal 10 may include one or more (only one is shown in FIG. 1) processors 102 (the processor 102 may include, but is not limited to, a processing device such as a microprocessor MCU or a programmable logic device FPGA) and a memory 104 for storing data. In one embodiment, the above-mentioned mobile terminal may also include a transmission device 106 and an input/output device 108 for communication functions. Those skilled in the art will appreciate that the structure shown in FIG. 1 is provided only for illustration, and is not intended to limit the structure of the above-mentioned mobile terminal. For example, the mobile terminal 10 may also include more or fewer components than those shown in FIG. 1 or have a different configuration from that shown in FIG. 1.

The memory 104 may be used to store a computer program, for example, a software program and a module of application software, such as a computer program corresponding to a message receiving method in the embodiments. The processor 102, by executing the computer program stored in the memory 104, executes various functional applications and data processing to implement the above method. The memory 104 may include a high-speed random access memory, and may also include a non-volatile memory, such as one or more magnetic storage devices, flash memories, or other non-volatile solid-state memories. In some embodiments, the memory 104 may further include memories remotely provided with respect to the processor 102. These remotely provided memories may be connected to the mobile terminal 10 via a network. Examples of the network include, but are not limited to, the Internet, corporate intranets, local area networks, mobile communication networks, and combinations thereof.

The transmission device 106 is used to receive or send data via a network. Examples of the network may include a wireless network provided by a communication provider for the mobile terminal 10. In one example, the transmission device 106 includes a network interface controller (NIC), which may be connected to other network devices via a base station to communicate with the Internet. In one example, the transmission device 106 may be a radio frequency (RF) module used to communicate with the Internet in a wireless manner.

Figure 2:
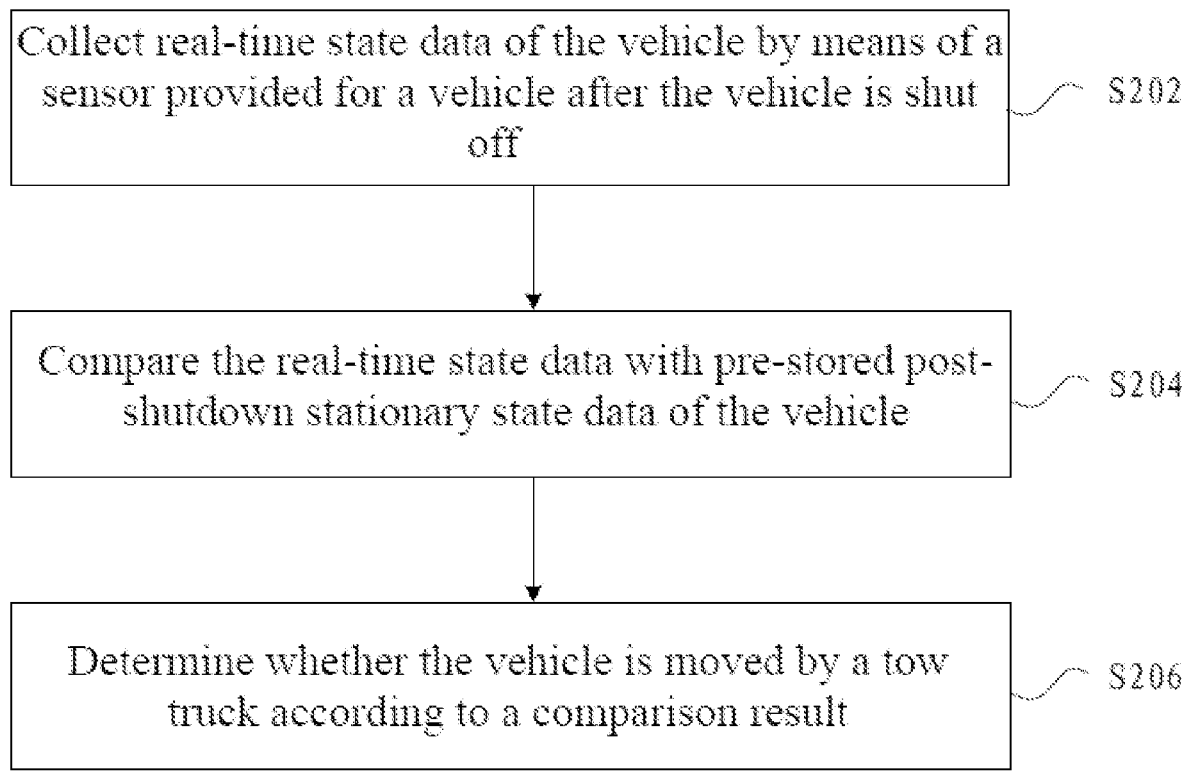
FIG. 2 is a flowchart of a vehicle movement identification method according to an embodiment of the present disclosure.

The present embodiment provides a vehicle movement identification method which is applied to an in-vehicle system and can establish a connection with the above-mentioned mobile terminal via a wireless connection. For example, a wireless connection can be established with the above-mentioned mobile terminal via a WIFI module. FIG. 2 is a flowchart of the vehicle movement identification method according to the embodiment. As shown in FIG. 2, the method includes the following steps.

In step S202, real-time state data of the vehicle is collected by means of a sensor provided for the vehicle after the vehicle is shut off.

In step S204, the real-time state data is compared with pre-stored post-shutdown stationary state data of the vehicle.

In step S206, it is determined whether the vehicle is moved by a tow truck according to a comparison result.

According to the above steps, after the vehicle is shut off, the state data of the vehicle is collected by means of the sensor, and the state data is compared with the pre-stored post-shutdown stationary state data of the vehicle to determine whether the vehicle is moved by the tow truck. After it is determined that the vehicle is moved by the tow truck, an alert is reported. This solves the problems, in the related technologies, of the high misidentification rate or high power consumption in identifying whether a vehicle is moved by a tow truck, improves the identification accuracy in identifying whether a vehicle is moved by a tow truck, and produces low power consumption, thereby achieving the effect of improving user experience.

In the embodiments, after it is determined that the vehicle is moved by the tow truck, an alert is reported. In one embodiment, when it is determined that the vehicle is moved by the tow truck, an alert message is sent to the mobile device via a networked device that is connected to a server in advance. The alert message is used to indicate that the vehicle is moved by the tow truck, i.e., to alert the mobile device via the server.

In the embodiments, it is necessary to determine in advance whether post-shutdown stationary state data of the vehicle has been stored. In one embodiment, before the sensor provided for the vehicle collects the real-time state data of the vehicle after the vehicle is shut off, it is detected that the engine of the vehicle has been shut off; it is then judged whether stationary state data of the vehicle has been stored; when it is judged that stationary state data of the vehicle has not been stored, stationary state data of the vehicle is acquired and stored. In one embodiment, acquiring the stationary state data of the vehicle may include the following steps. The sensor is enabled, and N real-time state data are collected by the sensor within a period of a first predetermined time. Each of the real-time state data includes X-axis data, Y-axis data, and Z-axis data, and each of the real-time state data is obtained by processing a plurality of raw data continuously collected within a second predetermined time. The raw data includes X-axis data, Y-axis data, and Z-axis data. N is an odd number greater than 1. The second predetermined time is less than the first predetermined time. The stationary state data is determined according to the N real-time state data. In one embodiment, determining the stationary state data according to the N real-time state data may include the following steps. The N real-time state data are designated as $A_1, A_2 \ldots, A_N$ respectively according to a collecting time sequence, and $((N+1)/2)^{th}$ real-time state data $$A_{\frac{(N+1)}{2}}$$

is taken as a base value. Volatility rates of respective ones of the N real-time state data relative to the $$A_{\frac{(N+1)}{2}}$$

are calculated based on a formula $$\frac{\left|A_{\frac{(N+1)}{2}} - A_i\right|}{A_{\frac{(N+1)}{2}}} \times 100\%,$$

where i is an integer greater than or equal to 1 and less than or equal to N. It is judged whether all the volatility rates of the respective ones of the N real-time state data relative to the $$A_{\frac{(N+1)}{2}}$$

are less than a predetermined threshold. When it is judged that all the volatility rates are less than the predetermined threshold, the $((N+1)/2)^{th}$ real-time state data is determined to be the stationary state data. Or, when it is judged that not all the volatility rates are less than the predetermined threshold, n real-time state data whose volatility rates are greater than the predetermined threshold among the volatility rates of the respective ones of the N real-time state data relative to the $$A_{\frac{(N+1)}{2}},$$

are repeatedly deleted; real-time state data retained after the n real-time state data being deleted are shifted forward; n real-time state data are then collected and combined with the real-time state data retained to obtain N real-time state data; volatility rates of respective ones of the combined N real-time state data relative to the $$A_{\frac{(N+1)}{2}}$$

are calculated; until all the volatility rates of the respective ones of the combined N real-time state data relative to the $$A_{\frac{(N+1)}{2}}$$

are less than the predetermined threshold, the $((N+1)/2)^{th}$ real-time state data is determined to be the stationary state data, n being an integer greater than or equal to 1 and less than N.

In one embodiment, comparing the real-time state data with the pre-stored post-shutdown stationary state data of the vehicle may include at least one of the following steps. It is judged whether there is an angle of inclination of at least one axis that is greater than a predetermined angle in the real-time state data as compared with the stationary state data, and it is judged whether there is a data offset of at least one axis that is greater than a first predetermined value in the real-time state data as compared with the stationary state data.

In another embodiment, comparing the real-time state data with the pre-stored post-shutdown stationary state data of the vehicle may include the following steps. The real-time state data is compared with the pre-stored post-shutdown stationary state data of the vehicle multiple times within a third predetermined time to obtain multiple comparison results, and it is judged whether a number of comparison results, of the multiple comparison results, indicating that the vehicle is moved by a tow truck is greater than a predetermined threshold.

In one embodiment, determining whether the vehicle is moved by a tow truck according to the comparison result may include the following steps. When it is judged that the vehicle is moved by a tow truck, it is determined that the vehicle is moved by a tow truck; and when it is judged that the vehicle is not moved by a tow truck, it is determined that the vehicle is not moved by a tow truck.

In order to avoid wasting of storage space and ensure validity and accuracy of the stationary state data, after it is detected that the engine of the vehicle is started or the alert message is reported, the stationary state data is deleted.

In the embodiments, before the sensor provided for the vehicle collects the real-time state data of the vehicle after the vehicle is shut off, it is necessary to ensure that the sensor is in a working state. In one embodiment, the sensor is detected, and it is determined that the sensor is in a normal working state.

In the embodiments, before alerting, it is necessary to determine that the networked device is in a normal working state. In one embodiment, before the alert message is sent to the mobile device via the networked device that is connected to the server in advance, it is judged whether the networked device has been powered on or in an activated state. When it is judged that the networked device has been powered on or in the activated state, the alert message is sent to the networked device; and when it is judged that the networked device has not been powered on or in the activated state, the networked device is notified to power on or the networked device is activated.

In order to reduce power consumption, after the alert message is sent to the mobile device via the networked device that is connected to the server in advance, the networked device is put to sleep or shut down. In one embodiment, an interrupt signal is sent to the networked device. The interrupt signal is used to instruct the networked device to enter a sleep state or shut down.

The sensor in the embodiments may be an acceleration sensor, and the networked device may be an upper computer.

Figure 3:
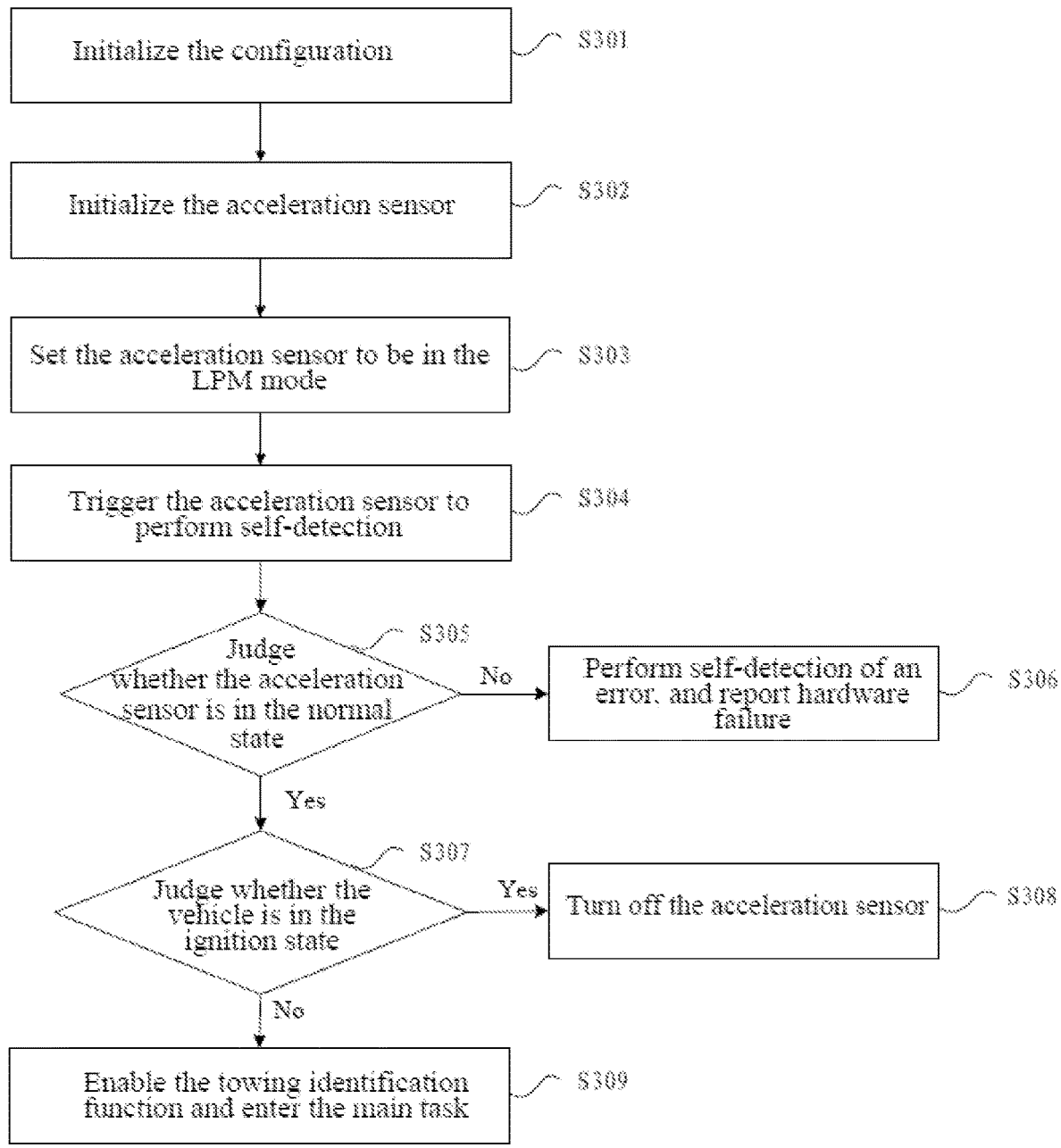
FIG. 3 is a flowchart of initialization identification by a lower computer according to an embodiment of the present disclosure.

FIG. 3 is a flowchart of initialization identification by a lower computer according to an embodiment of the present disclosure. As shown in FIG. 3, in step S301, configuration is initialized; in step S302, an acceleration sensor is initialized; in step S303, the acceleration sensor is set to be in an LPM mode; in step S304, the acceleration sensor is triggered to perform self-detection; in step S305, it is judged whether the acceleration sensor is in a normal state, wherein when it is judged that the acceleration sensor is not in the normal state, step S306 is executed, and when it is judged that the acceleration sensor is in the normal state, step S307 is executed; in step S306, self-detection of an error is performed, and hardware failure is reported; in step S307, it is judged whether the vehicle is in an ignition state, wherein when it is judged that the vehicle is in the ignition state, step S308 is executed, and when it is judged that the vehicle is not in the ignition state, step S309 is executed; in step S308, the acceleration sensor is turned off; and in step S309, a towing identification function is enabled and the process enters a main task.

Figure 4:
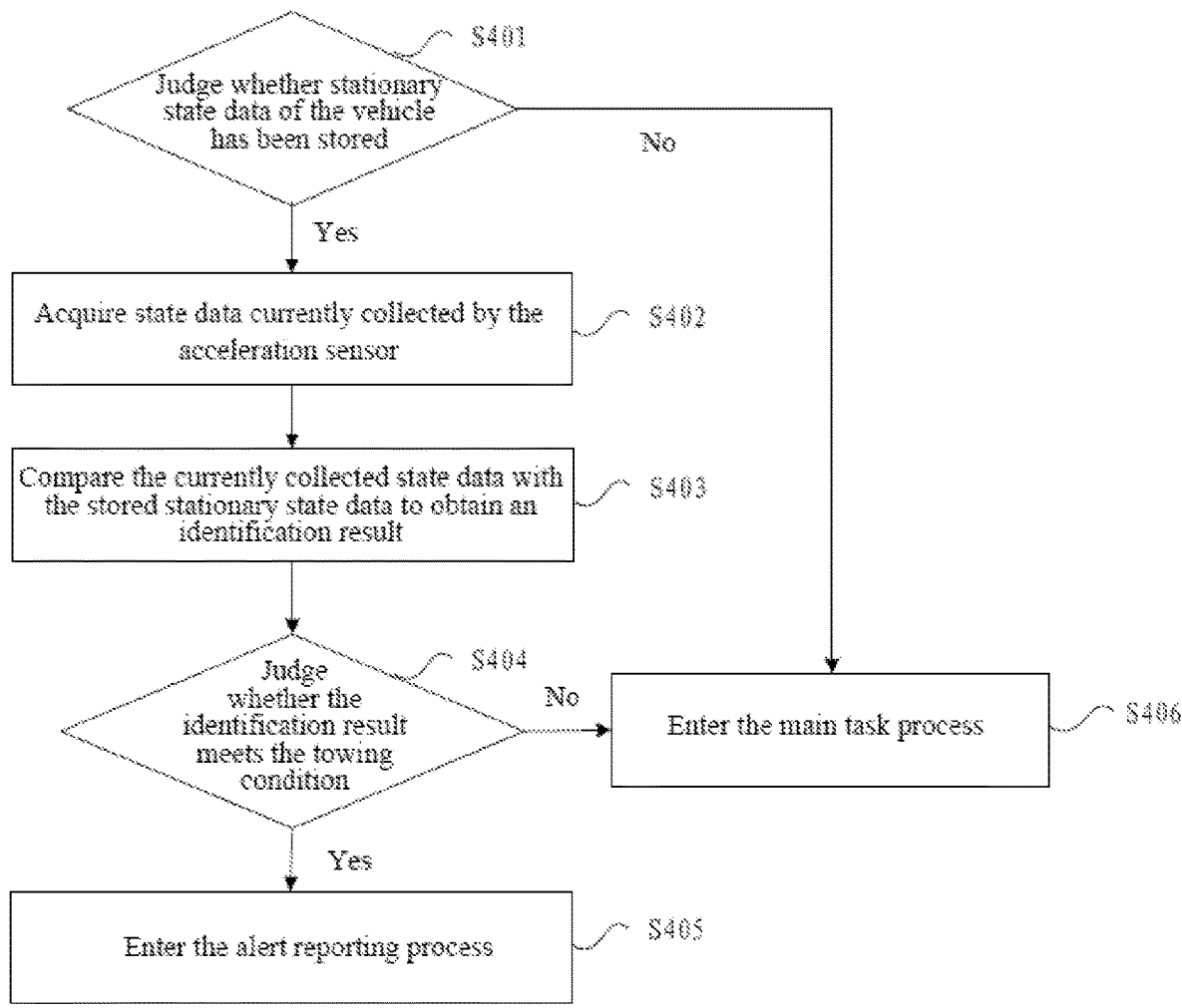
FIG. 4 is a flowchart of main task identification by a lower computer according to an embodiment of the present disclosure.

FIG. 4 is a flowchart of main task identification by the lower computer according to an embodiment of the present disclosure. As shown in FIG. 4, in step S401, it is judged whether stationary state data of the vehicle has been stored, wherein when it is judged that stationary state data of the vehicle has been stored, step S402 is executed, and when it is judged that stationary state data of the vehicle has not been stored, step S406 is executed; in step S402, state data currently collected by the acceleration sensor is acquired; in step S403, the currently collected state data is compared with the stored stationary state data to obtain an identification result; in step S404, it is judged whether the identification result meets a towing condition, wherein when it is judged that the identification result meets the towing condition, step S405 is executed, and when it is judged that the identification result does not meet the towing condition, step S406 is executed; in step S405, the process enters an alert reporting process; and in step S406, the process enters a main task process.

Figure 5:
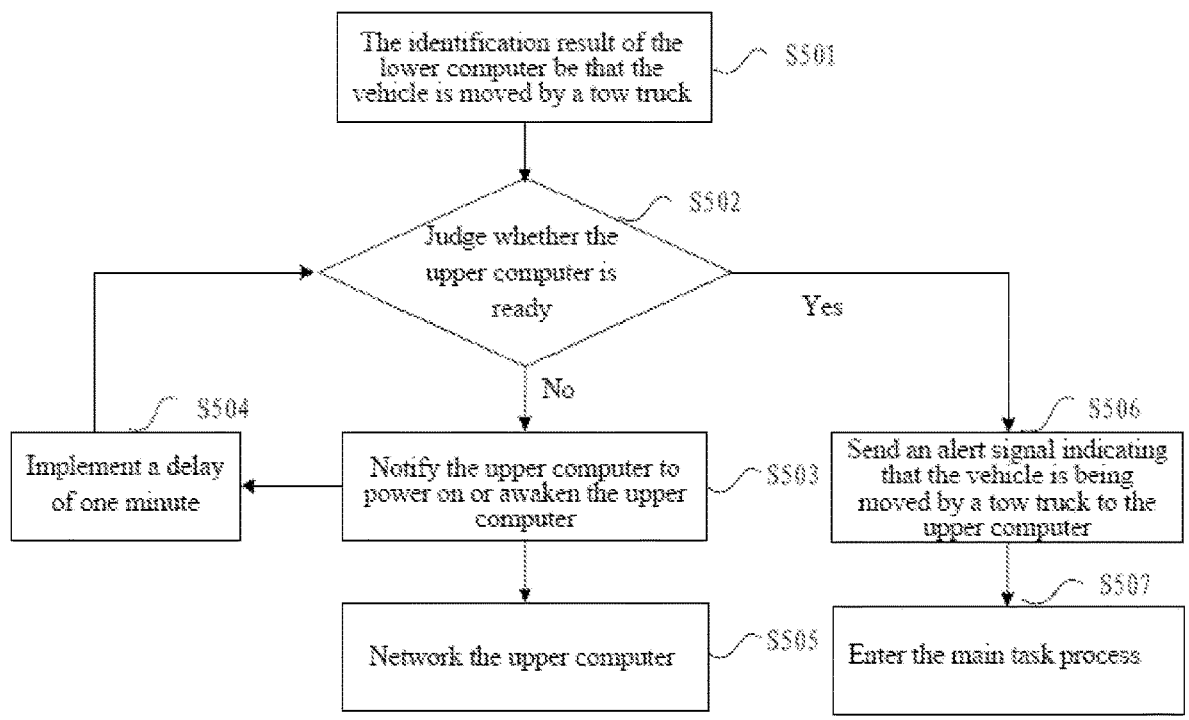
FIG. 5 is a flowchart of alerting by an upper computer according to an embodiment of the present disclosure.

FIG. 5 is a flowchart of alerting by the upper computer according to an embodiment of the present disclosure. As shown in FIG. 5, in step S501, the identification result of the lower computer is that the vehicle is moved by a tow truck; in step S502, it is judged whether the upper computer is ready, wherein when it is judged that the upper computer is not ready, step S503 is executed, and when it is judged that the upper computer is ready, step S506 is executed; in step S503, the upper computer is notified to power on or the upper computer is awakened; in step S504, a delay of one minute is implemented; in step S505, the upper computer is networked; in step S506, an alert signal indicating that the vehicle is being moved by a tow truck is sent to the upper computer; and in step S507, the process enters the main task process.

In the embodiment of the initialization process, the lower computer is powered on and the entire device enters the initialization process; the original CPU configuration and other hardware configurations of the lower computer are initialized and configured, and the acceleration sensor hardware is powered on and configured. The acceleration sensor usually has a variety of operating frequency configurations to choose from. In this embodiment, the acceleration sensor does not need a high-speed and high-frequency mode, but needs to be configured to be in a low-speed mode with an operating frequency set to be below 50 Hz. The lower the operating frequency is, the lower the power consumption is, but the operating frequency is not lower than a lowest frequency of the acceleration sensor. It is usually considered that a low-frequency working mode is the LPM mode. After the setting is completed, a self-detection on hardware components of the acceleration sensor is performed. The self-detection is to currently confirm whether the hardware is working normally, and to confirm whether the lower computer reads three-axis data normally. When the lower computer does not read three-axis data normally, the result needs to be stored and reported to other main control systems of an on-board ECU so that a hardware fault of the sensor is determined. When it is determined through the self-detection that the hardware is normal, the current ignition state of the car is determined. If the vehicle has already been ignited, the acceleration sensor is turned off and meanwhile the towing identification function is turned off.

The purpose of towing identification is to notify an owner of a car being towed when the car is towed under the circumstance that the owner is not on the scenario and the car is not ignited. Therefore, when the car is ignited, towing of the car will not be identified. When the device is powered on and the car is in the shutoff state, the towing identification function needs to be enabled.

The identification function enters the main task process. The main task of the towing identification is one of multiple tasks of the lower computer. In order to maintain a low power consumption state, the main task process of the towing identification is set to last for a period of N seconds. N may be adjusted according to identification time, and a recommended value for N is 1. For example, in the case of the value being 1, for a CPU of a lower computer with a computing power at 50 MHz, a relatively low acquisition frequency can be achieved, which helps to maintain very low power consumption. When the car is in the ignition state, the main task of the towing identification is in the off state, i.e., it does not contribute to operation consumption of the CPU of the lower computer.

The main task of the towing identification is set to last for a period of 1 second. When a time lower computer supports the main task of the towing identification, the main task is started. First, it is determined whether stationary reference data has been stored. If it is determined that stationary reference data has not been stored, the process is returned to a starting position of the main task.

After the car is shut off, when towing movement occurs, acquisition of stationary data of the car starts. This data is used as reference data for the towing identification. First, an accurate acquisition mechanism and storage timing are established on the lower computer.

The timing mechanism for acquiring the stationary data is as follows. After the car is shut off, the lower computer enters the task of the towing identification, determines whether the stationary data of the car has been stored, and enters a stationary data storage mode if the stationary data of the car has not been stored. The acceleration sensor is enabled to continuously acquire multiple groups of raw data per unit time, namely bare data on X, Y, and Z axes of the acceleration sensor, and average processing is performed on the acquired continuous multiple groups of data. In this example, the unit time may be set as 50 milliseconds within which 5 groups of data are acquired. The unit time and the number of groups of the data referred to herein are not unique. The purpose is to average the data acquired in a short time to ensure accuracy of the data.

In one embodiment, preconditions may be set for entering the towing identification to ensure higher accuracy of the towing identification. For example, it is required that the car be provided with a lock and a locked state.

The obtained averaged groups of data are stored, for example, in A1 of storage group Am of m groups of data. A1 here is not the stationary state data of the car required in the comparison performed for the towing identification. After the storage of the data in A1 is completed, entering the main task of the towing identification is delayed again until the m groups of data are obtained. In the above example, entering the task of the towing identification is delayed 1 second, and the number m of the data groups is set to 31. The delayed time and the number of the data groups are not unique. The principle is to control the continuous time for the continuous acquisition of data to be within 20-60 seconds, and an example period of time is 31 seconds. According to the principle of continuous-time azimuth control, when the time is too short, a relatively high probability of obtaining inaccurate data may be resulted in because the car has just been shut off and a passenger opens and closes the door when getting off, and when the continuous time is too long, it may lead to a relatively long period of data acquisition and thus high power consumption.

When 31 groups of data are obtained, with A16 in the A31 storage group being taken as a reference, differences between A16 and respective ones of A1-A31 are calculated in sequence, and volatilities of the differences are calculated. For example, (A16-A1)% A16. If the volatilities of the differences of all groups of data are less than 1%, A16 is taken as the reference data of the car in the stationary state. If not all the volatilities of the differences of all groups of data are less than 1%, the data in A1 is enabled invalid (i.e., the data in A1 is cleared), and the data in A2 is stored into A1, etc., until the data in A31 is stored into A30 with the data in A31 being cleared. In a next cycle of the task, a group of data is reacquired and stored into A31, and volatilities of differences are recalculated until all the volatilities are less than 1%; otherwise, the above operation is repeated.

The above method of acquiring the stationary state of the car has been verified to be accurate and efficient. In conventional acquiring method, the operating frequency of an acceleration sensor is increased to acquire data values in real time, and the stationary state is obtained based on a curve within a period of time. Such a method requires that a lower computer continuously works and have high computing power, in which case continuous high-speed acquisition of data and calculation of a large amount of data consume more CPU and increase power consumption. Another important point is that a lower computer, instead of having one acceleration sensor only, usually has other devices such as CAN and sensors. When real-time acquisition of acceleration sensor data and complex calculation are performed, problems such as CAN network delays may be caused, affecting normal operation of other tasks, which makes it difficult to pass verification in vehicle specification parameter verification test.

The above method is to acquire the three-axis data of the acceleration sensor by increasing the interval. The acquired data values are distributed in a point manner on the time axis. The low-frequency data acquisition may not affect other tasks. It is tested whether the car has entered the stationary state normally by means of volatilities between the data points. Through a large number of data verification tests, it is verified that, for fluctuations produced by a car in a stationary state, for example, large fluctuations produced by opening and closing the door, opening and closing the hood, opening and closing the trunk, etc., the duration of a peak of a waveform thereof within a continuous time does not exceed 1 second. The above-mentioned time interval and calculation method for acquiring data can eliminate residual vibration of an engine, filter out the effects of large vibration fluctuations caused by opening and closing the door, opening and closing the trunk, etc., and greatly reduce power consumption compared with a traditional real-time data acquisition method.

There are two different scenarios where the stationary state data of the car needs to be deleted: 1. Any time the car is ignited, the stationary state data needs to be deleted; 2. After a towing signal is identified, when it has been identified that the car is being towed and the signal has been reported to the upper computer, the currently stored stationary state data needs to be deleted.

Under the condition that the stored data is present and the vehicle is shut off, the lower computer obtains the data currently collected by the acceleration sensor, and compares the current data with the stored stationary data to determine whether the current data meets requirements for the identification. The comparison method is as follows. The identification method is to identify based on physical characteristics of the car being towed by a tow truck. Actions in implementing the towing are also different and diversified. There are substantially the following four different scenarios.

Scenario 1: After the car enters the stationary state, the front and rear wheels are not locked with the brake.

Scenario 2: After the car enters the stationary state, the front wheels are locked with the brake, but the rear wheels are not locked.

Scenario 3: After the car enters the stationary state, the front wheels are not locked with the brake, and the rear wheels are locked.

Scenario 4: After the car enters the stationary state, both the front and rear wheels are locked.

The process of implementing the towing in Scenario 1: The carriage of the tow truck is inclined, and the car is towed into the carriage into the carriage of the tow truck by using a tow rope. After the car is in place, the carriage of the tow truck is enabled flat. In this case, an inclination angle of the car ranges from 0 degree to 20 degrees. Here the angle refers to an angle corresponding to the trigonometric function. Depending on the towing speed of the tow truck, duration of changing from 5 degrees to 20 degrees is between 30 seconds and 120 seconds, or even longer.

The process of implementing the towing in Scenario 2: The car is not towed into the carriage of the tow truck. Instead, traction wheels are fixed on the front wheels of the car or the front wheels are fixed to the tow truck, with the rear wheels touching the ground. In this case, the car is at a relatively fixed angle of inclination. According to a large number of verification tests, this angle of inclination ranges from 3.5 to 7 degrees, and is maintained until the car arrives a desired location and the towing stops.

In Scenario 3 and Scenario 4, the car cannot be towed using a towing rope or transported using the method as used in Scenario 2 because the rear wheels are locked, and towing forcibly is harmful to the car. In this case, a current method commonly used by towing companies is to incline the carriage of the tow truck box, fix or not fix wheels on the front wheels of the car, back the tow truck continuously after the carriage of the tow truck is inclined to slide the entire car into the carriage, fix the four wheels of the car, and then put the carriage of the tow truck flat to further transport the car. In this scenario, the towed car is inclined continuously by 0 to 15 degrees and then returned from 15 degrees to 0 degree, which whole process lasts for more than 60 seconds and the inclination angle between 4.5 degrees and 15 degrees lasts for more than 30 seconds.

The method used in Scenario 3 and Scenario 4 are also applicable to Scenario 1 and Scenario 2, and is a commonly used towing method.

In summary, the several different towing methods described above have the following common rules.

The towed car maintains an inclination angle of over 4.5 degrees for more than 30 seconds.

Since the weight of a car with less than 7 seats is usually more than 800 Kg, in which case a fluctuation of more than 75 mg (mg is the unit of acceleration) is produced on the acceleration sensor the moment when the car is towed from the stationary state thereof.

Experimental tests show that on smooth roads and uneven roads, the car will produce a continuous vibration of more than 50 mg when being towed and transported.

The idea of comparing the current state data with the stationary state data in the embodiments is produced based on the above three rules and is obtained by way of an appropriate method. When the car is towed, if the acceleration sensor is used to calculate the inclination angle of the car plane, the acceleration sensor needs to work at over 100 Hz, and the lower computer performs real-time data output on the three axes and then further performs complex calculations such as integration. In this case, the CPU of the lower computer is seriously occupied, and thus the overall power consumption and the execution of other tasks by the lower computer are affected. Here, the angle of the plane is transformed into the independent angles of the three axles of the acceleration sensor, and each axis is positioned at 4.5 degrees against the inclination angle. The three-axis plane angle calculation is thus changed to a single-axis single-dimensional calculation. Combined with the frequency of entering the identification task which is 1 second, the operating frequency of the acceleration sensor may be set to a frequency below 50 Hz. Continuous data acquisition and continuous calculation are changed to calculations at intervals, which can also reduce the power consumption of the CPU.

The method of calculating the data used for comparison is to calculate, based on the data of the acceleration sensor collected this time and the stationary data, whether the inclination angle of any one axis is greater than 4.5 degrees, and/or whether the offset of any one axis exceeds 50 mg.

If the above conditions are met, it is considered that the car may currently be in a state of being towed, and if the conditions are not met, it is considered that the car may currently not be in a state of being towed. Regardless of the current possible state, the results need to be stored in B30 data storage group. Note that one group B30 may continuously store storage groups of 30 different results. By default, the storage group is in a non-towing possible state.

After storage of the results is completed, the lower computer enters the task of towing identification at a frequency of one second, and continues the process from step S501 to step S506 above. When B30 is full with stored data, current possible towing accumulation states are calculated. When the states are greater than 7 times, and each of the current states also meets a possible towing state, it enters a towing alert mode. When the states are greater than 7 times, and each of the current states also meets the possible towing state, it continues to enter the process from step S501 to step S506 above. When it enters the process again, the current states are calculated and stored in B1, and calculation of the current possible states are recalculated. If the condition is met, it enters the alert mode, and if the condition is not met, the actions are repeated and states of B2-B30 are updated.

Further, the above accumulated conditions namely the 7 times and 30 state sets are related to time conditions. In this example, the results of the 7 times are accumulated within 30 seconds. It is not necessary to choose 30 seconds and 7 times. The above results are reasonable values resulted from testing and verification based on big data. If the time for continuous identification is too long, the probability of accurate identification will be reduced, and if the time for continuous identification is too short, the probability of misidentification will be increased. Similarly, the smaller the number of accumulated times is, the higher the probability of misidentification is, and the greater the number of accumulated times is, the lower the probability of misidentification is. Appropriate adjustment may be made depending on the length of the car itself, the height of the four wheels, and the weight, but the basic method may not be changed.

After the alert signal is identified, it is judged whether the upper computer is ready. If the upper computer is ready, a signal is directly sent to inform the upper computer. If the upper computer is not ready, the upper computer is notified to get ready, and if the upper computer is in the shutdown state, the upper computer is powered on. If the upper computer is in the sleep state, the upper computer is awakened, and the upper computer is powered on to resume the networking state, and after a delay of one minute the state of the upper computer is confirmed again.

After the car is shut off, due to the relatively large power consumption of the upper computer, the upper computer usually automatically enters the standby or shutdown state according to the length of the parking time. When the upper computer is in sleep or standby state, the communication between the lower computer and the upper computer is interrupted; therefore, the lower computer awakens the upper computer and uses a hardware interrupt method to trigger the upper computer to return to the power-on state, so that the communication between the lower computer and the lower computer is realized. After the upper computer receives the signal from the lower computer, the upper computer will enter the sleep or shutdown mode again according to a standby and sleep strategy for the upper computer.

In one embodiment, in order to meet requirements for better power consumption, the connection between the lower computer and the acceleration sensor may usually include, in addition to the communication connection, interrupt signal connection of the acceleration sensor to the lower computer. The lower computer may be configured to be able to enter the shutdown and sleep state, and the acceleration sensor may be configured to awaken the lower computer at an appropriate time to avoid the lower computer from periodically entering the identification task or may also be configured to trigger the lower computer to power on by means of an interrupt signal when the lower computer is powered off, which can further reduce power consumption.

In the initialization process, the acceleration sensor is configured to be capable of interrupt enable. When the three-axis motion fluctuation of the acceleration sensor exceeds a certain value, an interrupt is generated immediately to awaken the lower computer. If the lower computer is in the working state, the lower computer ignores the interrupt signal. If the lower computer is in the shutdown state, the interrupt signal prompts the lower computer to power on. When the lower computer is in the sleep state, the interrupt signal awakens the lower computer up. After the lower computer is powered on or awakened, it enters the towing identification state and enters the main task of the identification process.

To further reduce the overall power consumption, after the lower computer is awakened by the interrupt event from the acceleration sensor, the lower computer recognizes that the awakening source is the acceleration sensor. If no towing identification signal occurs within a period of time (defined as 120 seconds in this example), and if an interrupt signal is not received from the acceleration sensor during this period, the lower computer may enter the sleep or shutdown state. As to whether to enter the sleep mode or the shutdown mode, it can be determined according to the operations of other tasks by the lower computer. The towing identification task is a necessary condition for the lower computer to enter the sleep or shutdown state.

The embodiments can quickly identify actions of a car being towed and achieve a high identification rate. The reference data is obtained at large intervals; the number of data points obtained is accurate; useless fluctuating data packets can be filtered out directly and efficiently; the amount of data obtained is small, the calculation is small, and the power consumption is low.

Through the description of the above embodiments, those skilled in the art may understand that the methods according to the above embodiments can be implemented by means of software plus necessary general hardware platforms, and of course may also be implemented by hardware, but in many cases the former is better. Based on such understanding, the technical solutions of the present disclosure essentially or the part thereof that contributes to some situations can be embodied in the form of a software product. The computer software product is stored in a storage medium (such as a ROM/RAM, a magnetic disk, an optical disk), and includes a plurality of instructions to cause a terminal device (which can be a mobile phone, a computer, a server, or a network device, etc.) to execute the method described in each of the embodiments.

Embodiment 2

In this embodiment, a vehicle movement identification device is provided. The device is used to implement the above embodiments and preferred implementations, and those having been described will not be repeated. As used below, the term "module" can implement a combination of software and/or hardware with predetermined functions. Although the devices described in the following embodiments are preferably implemented by software, implementation by hardware or a combination of software and hardware is also possible and contemplated.

Figure 6:
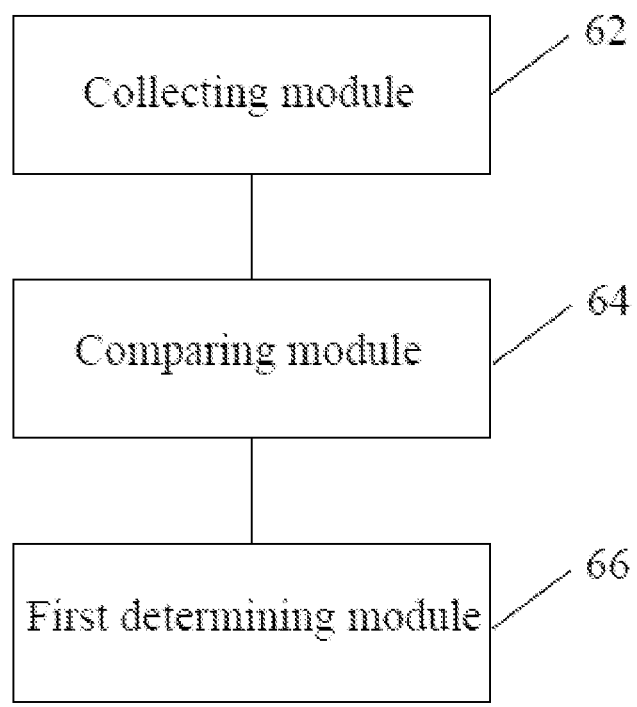
FIG. 6 is a block diagram of a vehicle movement identification device according to an embodiment of the present disclosure.

FIG. 6 is a block diagram of the vehicle movement identification device according to the embodiment of the present disclosure. As shown in FIG. 6, the device includes: a collecting module 62, which is used to collect real-time state data of a vehicle by means of a sensor provided for the vehicle after the vehicle is shut off; a comparing module 64, which is used to compare the real-time state data with pre-stored post-shutdown stationary state data of the vehicle; and a first determining module 66, which is used to determine whether the vehicle is moved by a tow truck according to a comparison result.

In one embodiment, the device further includes an alert sending module, which is used to send an alert message to a mobile device via a networked device that is connected to a server in advance, when it is determined that the vehicle is moved by the tow truck. The alert message is used to indicate that the vehicle is moved by a tow truck.

In one embodiment, the device further includes: a detecting module, which is used to detect that an engine of the vehicle has been shut off; a judging module, which is used to judge whether stationary state data of the vehicle has been stored; and an acquiring module, which is used to acquire and store stationary state data of the vehicle when it is judged that stationary state data of the vehicle has not been stored.

In one embodiment, the acquiring module includes: an enabling unit, which is used to enable the sensor; a collecting unit, which is used to collect N real-time state data within a period of a first predetermined time by means of the sensor, each of the real-time state data including X-axis data, Y-axis data, and Z-axis data, and each of the real-time state data being obtained by processing a plurality of raw data continuously collected within a second predetermined time, the raw data including X-axis data, Y-axis data, and Z-axis data, N being an odd number greater than 1, and the second predetermined time being less than the first predetermined time; and a first determining unit, which is used to determine the stationary state data according to the N real-time state data.

In an embodiment, the determining unit is further used to designate the N real-time state data as $A_1, A_2, \ldots, A_N$ respectively according to a collecting time sequence, and take $((N+1)/2)^{th}$ real-time state data $$A_{\frac{(N+1)}{2}}$$

as a base value; calculate volatility rates of respective ones of the N real-time state data relative to the $$A_{\frac{(N+1)}{2}}$$

based on a formula $$\frac{\left|A_{\frac{(N+1)}{2}} - A_i\right|}{A_{\frac{(N+1)}{2}}} \times 100\%,$$

i being an integer greater than or equal to 1 and less than or equal to N; judge whether all the volatility rates of the respective ones of the N real-time state data relative to the $$A_{\frac{(N+1)}{2}}$$

are less than a predetermined threshold; determine that the $((N+1)/2)^{th}$ real-time state data is the stationary state data when judging that all the volatility rates of the respective ones of the N real-time state data relative to the $$A_{\frac{(N+1)}{2}}$$

are less than the predetermined threshold; or repeatedly delete n real-time state data whose volatility rates are greater than the predetermined threshold among the volatility rates of the respective ones of the N real-time state data relative to the $$A_{\frac{(N+1)}{2}}$$

when judging that not all the volatility rates of the respective ones of the N real-time state data relative to the $$A_{\frac{(N+1)}{2}}$$

are less than the predetermined threshold, shift forward real-time state data retained after deleting the n real-time state data, collect n real-time state data and combine the collected n real-time state data with the real-time state data retained to obtain N real-time state data, calculate volatility rates of respective ones of the combined N real-time state data relative to $((N+1)/2)^{th}$ real-time state data, and determine, until all the volatility rates of the respective ones of the combined N real-time state data relative to $$A_{\frac{(N+1)}{2}}$$

are less than the predetermined threshold, the $((N+1)/2)^{th}$ real-time state data to be the stationary state data, n being an integer greater than or equal to 1 and less than N.

In an embodiment, the comparing module includes at least one of the following: a first judging unit, which is used to judge whether there is an angle of inclination of at least one axis that is greater than a predetermined angle in the real-time state data as compared with the stationary state data; and a second judging unit, which is used to judge whether there is a data offset of at least one axis that is greater than a first predetermined value in the real-time state data as compared with the stationary state data.

In one embodiment, the comparing module includes: a comparing unit, which is used to compare the real-time state data with the pre-stored post-shutdown stationary state data of the vehicle multiple times within a third predetermined time to obtain multiple comparison results; and a third judging unit, which is used to judge whether a number of comparison results, of the multiple comparison results, indicating that the vehicle is moved by a tow truck is greater than a predetermined threshold.

In one embodiment, the first determining module 66 includes: a second determining unit, which is used to determine that the vehicle is moved by a tow truck when it is judged that the number of the comparison results, of the multiple comparison results, indicating that the vehicle is moved by a tow truck is greater than the predetermined threshold; and a third determining unit, which is used to determine that the vehicle is not moved by a tow truck when it is judged that the number of the comparison results, of the multiple comparison results, indicating that the vehicle is moved by a tow truck is not greater than the predetermined threshold.

In one embodiment, the device further includes a deleting module, which is used to delete the stationary state data after it is detected that an engine of the vehicle is started or an alert message indicating that the vehicle is moved by a tow truck is reported.

In one embodiment, the device further includes: a detecting module, which is used to detect the sensor; and a second determining module, which is used to determine that the sensor is in a normal working state.

In one embodiment, the device further includes: a judging module, which is used to judge whether the networked device has been powered on or in an activated state; a first sending module, which is used to send the alert message to the networked device when it is judged that the networked device has been powered on or in the activated state; and a notifying module, which is used to notify the networked device to power on or activate the networked device if it is judged that the networked device has not been powered on or in the activated state.

In one embodiment, the device further includes a second sending module, which is used to send an interrupt signal to the networked device. The interrupt signal is used to instruct the networked device to enter a sleep state or shut down.

In one embodiment, the sensor is an acceleration sensor.

It should be noted that each of the above modules can be implemented by software or hardware. In case of the latter, it can be implemented in the following way, but not limited to the following way: the above modules are all located in a same processor; alternatively, the above modules can be combined in any combination and located in different processors.

Embodiment 3

Figure 7:
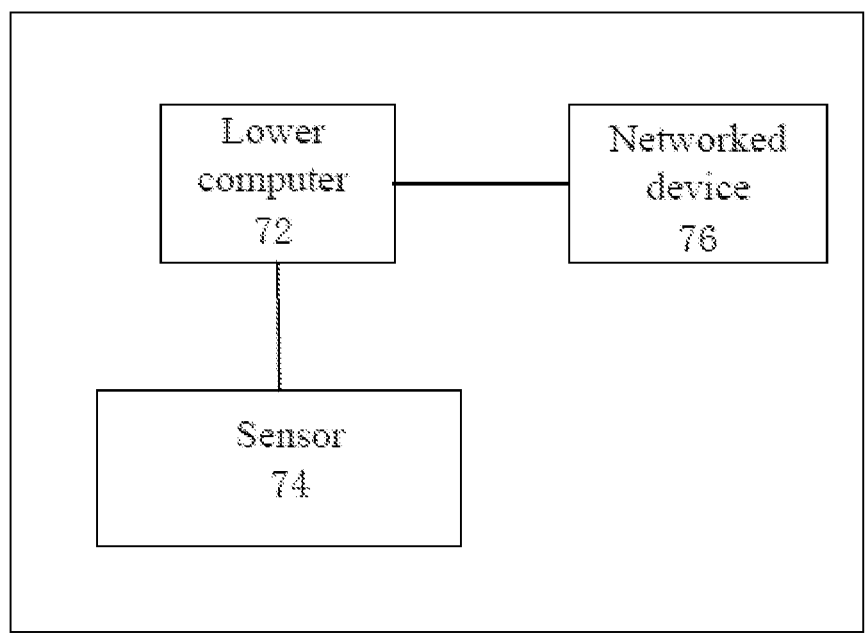
FIG. 7 is a block diagram of a vehicle alert system according to an embodiment of the present disclosure.

This embodiment provides a vehicle alert system. FIG. 7 is a block diagram of the vehicle alert system according to the embodiment. As shown in FIG. 7, the system includes a lower computer 72, a sensor 74, and a networked device 76. The lower computer 72 is connected to the sensor 74, and the lower computer 72 communicates with the networked device 76. The sensor 74 is used to collect real-time state data of a vehicle after the vehicle is shut off. The lower computer 72 is used to compare the real-time state data with pre-stored post-shutdown stationary state data of the vehicle, and send an alert message to the networked device 76 when the comparison result indicates that the vehicle is being moved by a tow truck, the alert message being used to indicate that the vehicle is moved by a tow truck. The networked device 76 is used to establish a connection with a server, and send the alert message to a mobile device through the server 78.

In one embodiment, the lower computer 72 is further used to detect that an engine of the vehicle has been shut off, determine whether stationary state data of the vehicle has been stored, and acquire and store stationary state data of the vehicle when it is judged that stationary state data of the vehicle has not been stored.

In one embodiment, the lower computer 72 is further used to enable the sensor 74. The sensor 74 is further used to collect N real-time state data within a period of a first predetermined time. Each of the real-time state data includes X-axis data, Y-axis data, and Z-axis data, and each of the real-time state data is obtained by processing a plurality of raw data continuously collected within a second predetermined time. The raw data includes X-axis data, Y-axis data, and Z-axis data. N is an odd number greater than 1. The second predetermined time is less than the first predetermined time. The lower computer 72 is further used to determine the stationary state data according to the N real-time state data.

In one embodiment, the lower computer 72 is also used to designate the N real-time state data as $A_1, A_2, \ldots, A_N$ respectively according to a collecting time sequence, and take $((N+1)/2)^{th}$ real-time state data $$A_{\frac{(N+1)}{2}}$$

as a base value; calculate volatility rates of respective ones of the N real-time state data relative to the $$A_{\frac{(N+1)}{2}}$$

based on a formula $$\frac{\left|A_{\frac{(N+1)}{2}} - A_i\right|}{A_{\frac{(N+1)}{2}}} \times 100\%,$$

i being an integer greater than or equal to 1 and less than or equal to N; judge whether all the volatility rates of the respective ones of the N real-time state data relative to the $$A_{\frac{(N+1)}{2}}$$

are less than a predetermined threshold; determine that the $((N+1)/2)^{th}$ real-time state data is the stationary state data when judging that all the volatility rates of the respective ones of the N real-time state data relative to the $$A_{\frac{(N+1)}{2}}$$

are less than the predetermined threshold; or repeatedly delete n real-time state data whose volatility rates are greater than the predetermined threshold among the volatility rates of the respective ones of the N real-time state data relative to the $$A_{\frac{(N+1)}{2}}$$

when judging mat not all the volatility rates of the respective ones of the N real-time state data relative to the $$A_{\frac{(N+1)}{2}}$$

are less than the predetermined threshold, shift forward real-time state data retained after deleting the n real-time state data, collect n real-time state data and combine the collected n real-time state data with the real-time state data retained to obtain N real-time state data, calculate volatility rates of respective ones of the combined N real-time state data relative to $((N+1)/2)^{th}$ real-time state data, and determine, until all the volatility rates of the respective ones of the combined N real-time state data relative to $$A_{\frac{(N+1)}{2}}$$

are less than the predetermined threshold, the $((N+1)/2)^{th}$ real-time state data to be the stationary state data, n being an integer greater than or equal to 1 and less than N.

In one embodiment, the lower computer 72 is further used to compare the real-time state data with the pre-stored post-shutdown stationary state data of the vehicle to obtain a comparison result which includes at least one of the following steps. It is judged whether there is an angle of inclination of at least one axis that is greater than a predetermined angle in the real-time state data as compared with the stationary state data, and when it is judged that there is an angle of inclination of at least one axis that is greater than a predetermined angle, the comparison result is that the vehicle is moved by a tow truck. It is judged whether there is a data offset of at least one axis that is greater than a first predetermined value in the real-time state data as compared with the stationary state data, and when it is judged that there is a data offset of at least one axis that is greater than a first predetermined value, the comparison result is that the vehicle is moved by a tow truck.

In one embodiment, the lower computer 72 is further used to compare the real-time state data with the pre-stored post-shutdown stationary state data of the vehicle multiple times within a third predetermined time to obtain multiple comparison results; judge whether a number of comparison results, of the multiple comparison results, indicating that the vehicle is moved by a tow truck is greater than a predetermined threshold; and determine that the vehicle is moved by a tow truck when it is judged that the number of the comparison results, of the multiple comparison results, indicating that the vehicle is moved by a tow truck is greater than the predetermined threshold In one embodiment, the lower computer 72 is further used to delete the stationary state data after it is detected that an engine of the vehicle is started or the alert message is reported.

In one embodiment, the lower computer 72 is further used to detect the sensor 74, and determine that the sensor 74 is in a normal working state.

In one embodiment, the lower computer 72 is further used to judge whether the networked device 76 has been powered on or in an activated state; send the alert message to the networked device 76 when judging that the networked device has been powered on or in the activated state; and notify the networked device 76 to power on or activate the networked device 76 when judging that the networked device has not been powered on or in the activated state.

In one embodiment, the lower computer 72 is used to send an interrupt signal to the networked device 76.

The networked device 76 is used to enter a sleep state or shut down according to the interrupt signal.

In one embodiment, the sensor 74 is further used to send an interrupt signal to the lower computer 72 when it is detected that there is a data offset of any axis in raw data that is greater than a second predetermined value.

The lower computer 72 is also used to receive the interrupt signal, and power on or enter an awakening state according to the interrupt signal.

In one embodiment, the lower computer 72 is further used to shut down or enter a sleep state if the vehicle is not moved by a tow truck and the interrupt signal is not received from the sensor 74 within a third predetermined time.

In one embodiment, the sensor 74 is an acceleration sensor.

In the embodiment, the towing and transporting identification system uses the acceleration sensor to provide storage of the stationary data of the towing operation and the identification of actions during the towing operation. The stationary data acquisition processing method provides identification parameters for reference, which effectively reduces misidentification. Action filter identification algorithm and identification process in the towing process are also provided. The lower computer, through calculations, generates action samples and filtered data to generate data for a comparison with the previous stationary data so as to identify the current action mode, and quickly identify, through accumulation over time, the towing state or transporting state of the car associated therewith.

The embodiments support towing identification, and send an alert after the identification. The above-mentioned networked device may be an upper computer or an on-board P-BOX, etc. The following description illustrates an example in which an upper computer is taken as the networked device. The alert system may include an upper computer, a lower computer, and an acceleration sensor. The lower computer is used to support the acceleration sensor. The upper computer supports connection to the network. The lower computer is capable of receiving data from the acceleration sensor, supporting towing action identification algorithm function, and realizing data communication with the upper computer. As a further expansion, the lower computer is capable of communicating with other on-board control system nodes to learn other state information of the vehicle. The upper computer is a device that can communicate with the network, and includes networked 2G, 3G, 4G and other terminal processing devices, as well as other terminal processing devices that can access WIFI hotspots and Bluetooth networks.

The upper computer and the lower computer are basic hardware components of commonly used car TBOX. The upper computer realizes data networking function and realizes data connection function to the Internet and the server. The lower computer realizes connection function with on-board electronic network. The lower computer is usually a small MCU controller, which is, according to the current mainstream trend, an automotive control MCU system that supports CAN network. The acceleration sensor is a sensor device capable of calculating acceleration. This device is usually connected to the lower computer by a hardware interface such as I2C I2S UART.

Embodiment 4

This embodiment provides a storage medium in which a computer program is stored. The computer program is configured to implement, when executed, steps in any of the foregoing method embodiments.

In one embodiment, the above storage medium may be used to store a computer program for implementing the following steps. In S11, after a vehicle is shut off, real-time state data of the vehicle is collected by means of a sensor provided for the vehicle. In S12, the real-time state data is compared with pre-stored post-shutdown stationary state data of the vehicle. In S13, it is determined whether the vehicle is moved by a tow truck according to a comparison result.

In one embodiment, the above storage medium may include, but is not limited to: a U disk, a read-only memory (ROM), a random access memory (RAM), a mobile hard disk, a magnetic disk or an optical disk, and other media that can store computer programs.

Embodiment 5

This embodiment provides an electronic device, including a memory and a processor. A computer program is stored in the memory. The processor is used to execute the computer program to implement steps in any of the foregoing method embodiments.

In one embodiment, the above electronic device may further include a transmission device and an input-output device. The transmission device is connected to the aforementioned processor, and the input-output device is connected to the aforementioned processor.

In one embodiment, the processor may be used to implement the following steps through the computer program. In S11, after a vehicle is shut off, real-time state data of the vehicle is collected by means of a sensor provided for the vehicle. In S12, the real-time state data is compared with pre-stored post-shutdown stationary state data of the vehicle. In S13, it is determined whether the vehicle is moved by a tow truck according to a comparison result.

In one embodiment, for examples in this embodiment, reference may be made to the examples described in the foregoing embodiments and alternative implementations, which will not be repeated herein in this embodiment.

Obviously, those skilled in the art should appreciate that the above modules or steps of the present disclosure can be implemented by a general computing device, and they can be concentrated on a single computing device or distributed in a network composed of multiple computing devices. In one embodiment, they can be implemented by program codes executable by a computing device, in which case they can be stored in a storage device for execution by the computing device; and in some cases, the steps shown or described may be performed in an order different from the order described herein, or they may be respectively fabricated into individual integrated circuit modules, or multiple modules or steps of them may be achieved by being fabricated into a single integrated circuit module. In this way, the present disclosure is not limited to any specific combination of hardware and software.

Through the present disclosure, the state data of the vehicle is collected by means of the sensor after the vehicle is shut off; the data is compared with the pre-stored post-shutdown stationary state data of the vehicle; it is determined whether the vehicle is moved by a tow truck; and after it is determined that the vehicle is moved by a tow truck, an alert is reported. This can solve the problems, in the related technologies, of the high misidentification rate or high power consumption in identifying whether a vehicle is moved by a tow truck, improves the identification accuracy in identifying whether a vehicle is moved by a tow truck, and produces low power consumption, thereby achieving the effect of improving user experience.

What is claimed is:
1. A vehicle movement identification method, comprising:
 collecting real-time state data of the vehicle by means of a sensor provided for a vehicle after the vehicle is shut off;
 comparing the real-time state data with pre-stored post-shutdown stationary state data of the vehicle; and
 determining whether the vehicle is moved by a tow truck according to a comparison result,
 wherein comparing the real-time state data with the pre-stored post-shutdown stationary state data of the vehicle comprises:
 comparing the real-time state data with the pre-stored post-shutdown stationary state data of the vehicle multiple times within a third predetermined time to obtain multiple comparison results; and
 judging whether a number of comparison results, of the multiple comparison results, indicating that the vehicle is moved by a tow truck is greater than a predetermined threshold.

2. The method according to claim 1, wherein after determining whether the vehicle is moved by a tow truck according to the comparison result, the method further comprises:
   sending an alert message to a mobile device via a networked device that is connected to a server in advance, when it is determined that the vehicle is moved by the tow truck, wherein the alert message is used to indicate that the vehicle is moved by a tow truck.

3. The method according to claim 1, wherein after collecting the real-time state data of the vehicle by means of the sensor provided for the vehicle after the vehicle is shut off, the method further comprises:
   detecting that an engine of the vehicle has been shut off;
   judging whether stationary state data of the vehicle has been stored; and
   acquiring and storing stationary state data of the vehicle when it is judged that stationary state data of the vehicle has not been stored.

4. The method according to claim 3, wherein acquiring stationary state data of the vehicle comprises:
   enabling the sensor;
   collecting N real-time state data within a period of a first predetermined time by means of the sensor, wherein each of the real-time state data comprises X-axis data, Y-axis data, and Z-axis data, and each of the real-time state data is obtained by processing a plurality of raw data continuously collected within a second predetermined time, the raw data comprising X-axis data, Y-axis data, and Z-axis data, wherein N is an odd number greater than 1, and the second predetermined time is less than the first predetermined time; and
   determining the stationary state data according to the N real-time state data.

5. The method according to claim 4, wherein determining the stationary state data according to the N real-time state data comprises:
   designating the N real-time state data as A1, A2, . . . , AN respectively according to a collecting time sequence, and taking $((N+1)/2)^{th}$ real-time state data $A_{(N+1)/2}$ as a base value;
   calculating volatility rates of respective ones of the N real-time state data relative to the $A_{(N+1)/2}$ based on a formula $$\frac{\left|A_{\frac{(N+1)}{2}} - A_i\right|}{A_{\frac{(N+1)}{2}}} \times 100\%,$$

wherein i is an integer greater than or equal to 1 and less than or equal to N;
   judging whether all the volatility rates of the respective ones of the N real-time state data relative to the $A_{(N+1)/2}$ are less than a predetermined threshold;
   determining that the $((N+1)/2)^{th}$ real-time state data is the stationary state data, when it is judged that all the volatility rates of the respective ones of the N real-time state data relative to the $A_{(N+1)/2}$ are less than the predetermined threshold; or
   repeatedly deleting n real-time state data whose volatility rates are greater than the predetermined threshold among the volatility rates of the respective ones of the N real-time state data relative to the $A_{(N+1)/2}$, when it is judged that not all the volatility rates of the respective ones of the N real-time state data relative to the $A_{(N+1)/2}$ are less than the predetermined threshold, shifting forward real-time state data retained after the n real-time state data are deleted, collecting n real-time state data and combining the collected n real-time state data with the real-time state data retained to obtain N real-time state data, calculating volatility rates of respective ones of the combined N real-time state data relative to $((N+1)/2)^{th}$ real-time state data, and determining, until all the volatility rates of the respective ones of the combined N real-time state data relative to $A_{(N+1)/2}$ are less than the predetermined threshold, the $((N+1)/2)^{th}$ real-time state data to be the stationary state data, n being an integer greater than or equal to 1 and less than N.

6. The method according to claim 1, wherein comparing the real-time state data with the pre-stored post-shutdown stationary state data of the vehicle comprises at least one of the following:
   judging whether there is an angle of inclination of at least one axis that is greater than a predetermined angle in the real-time state data as compared with the stationary state data, and
   judging whether there is a data offset of at least one axis that is greater than a first predetermined value in the real-time state data as compared with the stationary state data.

7. The method according to claim 6, wherein determining whether the vehicle is moved by a tow truck according to a comparison result comprises:
   determining that the vehicle is moved by a tow truck when it is judged that the vehicle is moved by a tow truck; and
   determining that the vehicle is not moved by a tow truck when it is judged that the vehicle is not moved by a tow truck.

8. The method according to claim 1, wherein the method further comprises:
   deleting the stationary state data after it is detected that an engine of the vehicle is started or an alert message indicating that the vehicle is moved by a tow truck is reported.

9. The method according to claim 1, wherein, before collecting the real-time state data of the vehicle by means of the sensor provided for the vehicle after the vehicle is shut off, the method further comprises:
   detecting the sensor; and
   determining that the sensor is in a normal working state.

10. The method according to claim 2, wherein before sending the alert message to the mobile device via the networked device that is connected to the server in advance, the method further comprises:
   judging whether the networked device has been powered on or in an activated state;
   sending the alert message to the networked device when it is judged that the networked device has been powered on or in the activated state; and
   notifying the networked device to power on or activate the networked device when it is judged that the networked device has not been powered on or in the activated state.

11. The method according to claim 10, wherein after sending the alert message to the mobile device via the networked device that is connected to the server in advance, the method further comprises:
   sending an interrupt signal to the networked device, wherein the interrupt signal is used to instruct the networked device to enter a sleep state or shut down.

12. The method according to claim 1, wherein the sensor is an acceleration sensor.

13. A vehicle alert system, comprising: a lower computer, a sensor, and a networked device, wherein the lower computer is connected to the sensor, and the lower computer communicates with the networked device, wherein:
the sensor is used to collect real-time state data of a vehicle after the vehicle is shut off;
the lower computer is used to compare the real-time state data with pre-stored post-shutdown stationary state data of the vehicle to obtain a comparison result, and send an alert message to the networked device when the comparison result indicates that the vehicle is being moved by a tow truck, wherein the alert message is used to indicate that the vehicle is moved by a tow truck; and
the networked device is used to establish a connection with a server, and send the alert message to a mobile device through the server,
wherein the lower computer is further used to:
compare the real-time state data with the pre-stored post-shutdown stationary state data of the vehicle multiple times within a third predetermined time to obtain multiple comparison results;
judge whether a number of comparison results, of the multiple comparison results, indicating that the vehicle is moved by a tow truck is greater than a predetermined threshold; and
determine that the vehicle is moved by a tow truck when it is judged that the number of the comparison results, of the multiple comparison results, indicating that the vehicle is moved by a tow truck is greater than the predetermined threshold.

14. The system according to claim 13, wherein the lower computer is further used to detect that an engine of the vehicle has been shut off, determine whether stationary state data of the vehicle has been stored, and acquire and store stationary state data of the vehicle when it is judged that stationary state data of the vehicle has not been stored.

15. The system according to claim 14, wherein:
the lower computer is further used to enable the sensor;
the sensor is further used to collect N real-time state data within a period of a first predetermined time, wherein each of the real-time state data comprises X-axis data, Y-axis data, and Z-axis data, and each of the real-time state data is obtained by processing a plurality of raw data continuously collected within a second predetermined time, the raw data comprising X-axis data, Y-axis data, and Z-axis data, wherein N is an odd number greater than 1, and the second predetermined time is less than the first predetermined time; and
the lower computer is further used to determine the stationary state data according to the N real-time state data.

16. The system according to claim 15, wherein the lower computer is further used to:
designate the N real-time state data as A1, A2, . . . , AN respectively according to a collecting time sequence, and take $((N+1)/2)^{th}$ real-time state data $A_{(N+1)/2}$ as a base value;
calculate volatility rates of respective ones of the N real-time state data relative to the $A_{(N+1)/2}$ based on a formula $$\frac{\left|A_{\frac{(N+1)}{2}} - A_i\right|}{A_{\frac{(N+1)}{2}}} \times 100\%,$$

wherein i is an integer greater than or equal to 1 and less than or equal to N;
judge whether all the volatility rates of the respective ones of the N real-time state data relative to the $A_{(N+1)/2}$ are less than a predetermined threshold;
determine that the $((N+1)/2)^{th}$ real-time state data is the stationary state data when judging that all the volatility rates of the respective ones of the N real-time state data relative to the $A_{(N+1)/2}$ are less than the predetermined threshold; or
repeatedly delete n real-time state data whose volatility rates are greater than the predetermined threshold among the volatility rates of the respective ones of the N real-time state data relative to the $A_{(N+1)/2}$ when judging that not all the volatility rates of the respective ones of the N real-time state data relative to the $A_{(N+1)/2}$ are less than the predetermined threshold, shift forward real-time state data retained after deleting the n real-time state data, collect n real-time state data and combine the collected n real-time state data with the real-time state data retained to obtain N real-time state data, calculate volatility rates of respective ones of the combined N real-time state data relative to $((N+1)/2)^{th}$ real-time state data, and determine, until all the volatility rates of the respective ones of the combined N real-time state data relative to $A_{(N+1)/2}$ are less than the predetermined threshold, the $((N+1)/2)^{th}$ real-time state data to be the stationary state data, n being an integer greater than or equal to 1 and less than N.

17. The system according to claim 13, wherein:
the lower computer is further used to compare the real-time state data with the pre-stored post-shutdown stationary state data of the vehicle to obtain the comparison result which comprises at least one of the following:
judging whether there is an angle of inclination of at least one axis that is greater than a predetermined angle in the real-time state data as compared with the stationary state data, wherein when it is judged that there is an angle of inclination of at least one axis that is greater than a predetermined angle, the comparison result is that the vehicle is moved by a tow truck, and
judging whether there is a data offset of at least one axis that is greater than a first predetermined value in the real-time state data as compared with the stationary state data, wherein when it is judged that there is a data offset of at least one axis that is greater than a first predetermined value, the comparison result is that the vehicle is moved by a tow truck.

18. A vehicle movement identification device, comprising:
a collecting module, which is used to collect real-time state data of a vehicle by means of a sensor provided for the vehicle after the vehicle is shut off;
a comparing module, which is used to compare the real-time state data with pre-stored post-shutdown stationary state data of the vehicle; and
a first determining module, which is used to determine whether the vehicle is moved by a tow truck according to a comparison result,
wherein the comparing module is used to compare the real-time state data with the pre-stored post-shutdown stationary state data of the vehicle by:
comparing the real-time state data with the pre-stored post-shutdown stationary state data of the vehicle multiple times within a third predetermined time to obtain multiple comparison results; and judging whether a number of comparison results, of the multiple comparison results, indicating that the vehicle is moved by a tow truck is greater than a predetermined threshold.

* * * * *